Jan. 22, 1963  H. S. LEVKOFF ETAL  3,074,547
PLASTIC CONTAINER
Filed Sept. 23, 1959
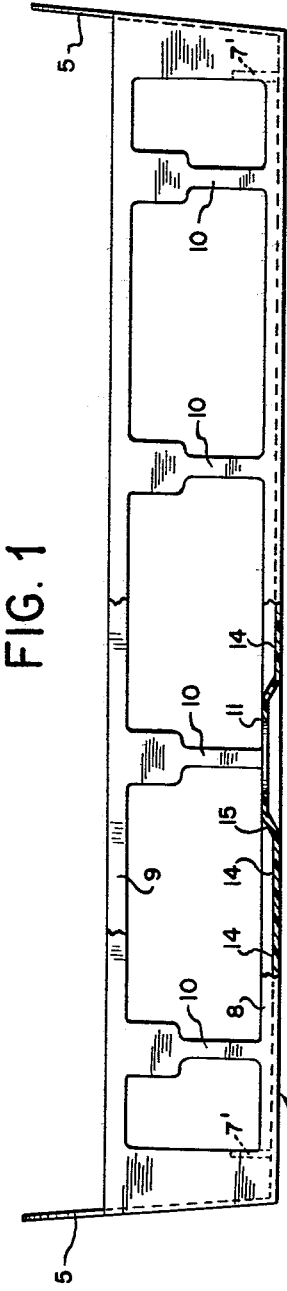
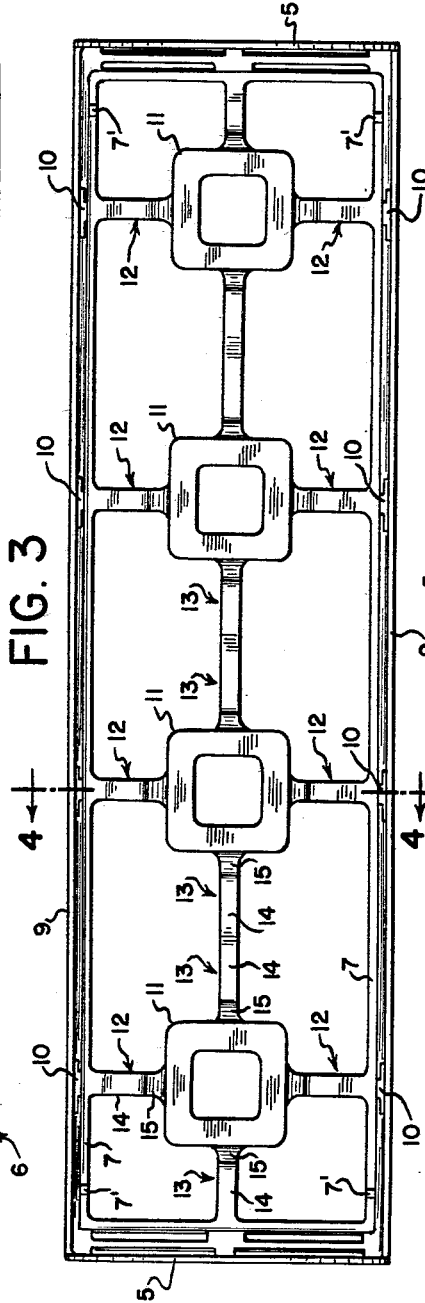
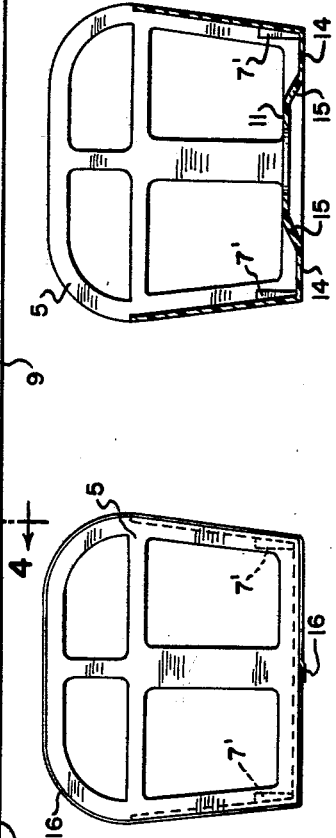
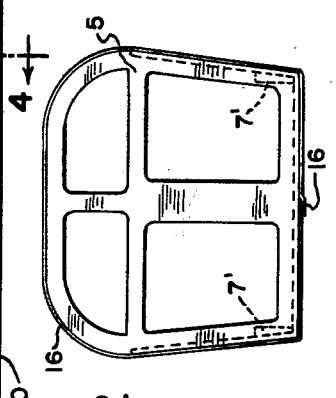
INVENTORS
HENRY S. LEVKOFF
BY DAVID LEVKOFF
ATTORNEYS though the pads effectively support the fruit, we have found that it is also desirable to mount the pads so that they are supported with as much resiliency as possible.

United States Patent Office 3,074,547
Patented Jan. 22, 1963

3,074,547
PLASTIC CONTAINER
Henry S. Levkoff and David Levkoff, Great Neck, N.Y., assignors of one-fourth to Evelyn G. Levkoff and one-fourth to Edith L. Sennet, both of Great Neck, N.Y.
Filed Sept. 23, 1959, Ser. No. 841,714
1 Claim. (Cl. 206—72)

This invention relates to plastic containers for fruit and the like and, more particularly, to plastic trays adapted, when loaded with fruit and overwrapped with a transparent sheet material, to give maximum support to the fruit while offering maximum exposure of the fruit for visual inspection.

A wide variety of structures for plastic trays for tomatoes and similarly fragile fruit have been proposed and used heretofore. Some of these structures, such as those described in United States Patents Nos. 2,706,038, 2,708,027, 2,708,028 and 2,712,383, include supporting cradles or pads for the fruit. Although such pads effectively support the fruit, we have found that it is also desirable to mount the pads so that they are supported with as much resiliency as possible.

We have now devised a plastic container for fruit which is characterized by a highly effective supporting pad for the fruit. The container of our invention is of the type which comprises two open framework end walls interconnected by a pair of longitudinal bottom rails and by a pair of side rails positioned above and spaced from the bottom rails. Pursuant to our invention, a plurality of longitudinally spaced resiliently supported cradle pads for the fruit are disposed in a plane substantially above that of the bottom of the container, each pad being supported in said plane by transverse supporting arms connected to the bottom rails and by at least one longitudinal supporting arm connected to a longitudinal supporting arm of a proximate cradle pad. Each of the aforementioned connecting arms comprises a body portion in the plane of the bottom of the container and an upwardly sloping spring portion interconnecting the body portion and the pad.

These and other novel features of the container of our invention will be more readily understood from the following description taken in conjunction with the accompanying drawings in which FIG. 1 is a side elevation, partly broken away, of a container embodying the invention;
FIG. 2 is an end view of the container with overwrap;
FIG. 3 is a top plan view of the container; and
FIG. 4 is a cross-sectional view taken along lines 4—4 in FIG. 3.

The container shown in the drawings is constructed of any suitable plastic having a combination of body and flexibility. For example, a mixture of about equal proportions of polyethylene and polystyrene provides a particularly effective combination of high impact strength and good flexibility.

The container comprises two open framework end walls 5, which are shown most clearly in FIG. 2, interconnected by a pair of longitudinal bottom rails 6, advantageously having the cross-sectional shape of an angle iron with one flange 7 lying in the plane of the bottom of the container and the other flange 8 lying in the plane of the side wall of the container. The end walls 5 are also interconnected by a second pair of side rails 9 positioned above and spaced from the side wall flange 8 of the bottom rail. The upper and lower side rails are interconnected by upright braces 10 the upper portion of which is advantageously relatively wide so as to give side support to the fruit without presenting a sharp edge which might cut or otherwise damage the skin of the fruit. The end walls and side walls advantageously slope outwardly to facilitate packing of the container with fruit and to permit nesting of empty containers for shipping to a packer. The bottom flanges 7 of the bottom rails are advantageously provided with upstanding lugs 7' which, when several containers are nested within one another, prevent the inner container from becoming wedged in the bottom of the outer container.

Support for the bottom of the fruit is provided, pursuant to the invention, by a plurality of open center cradle pads 11 positioned, as shown in FIG. 3, at spaced intervals along the bottom of the container so that each piece of fruit is supported by a separate pad. The cradle pads 11 are disposed in a plane substantially above the plane of the bottom of the container, and their support in this raised plane is sufficiently flexible to supply the resiliency required for support of each piece of fruit. The resilience of this support is provided by the structure of the supporting arms which carry the pads. Regardless of whether the pads are substantially rectangular in outline as shown in the drawing, or are circular or oval, each pad 11 is supported by transverse supporting arms 12 connected to the bottom flange portions 7 of the bottom rails 6 and by at least one longitudinal supporting arm 13 of a proximate cradle pad. As most clearly shown in FIG. 4, each transverse supporting arm 12 comprises a main body portion 14 joined to the bottom flange 7 of the bottom rail 6 and lying in substantially the same plane as the bottom flange 7. The inboard end of the body portion is joined to an upwardly sloping spring portion 15 of the supporting arm, and the upper end of the spring portion 15 is joined advantageously directly to the pad or, alternatively, to an extension of the pad lying substantially in the plane of the pad. Thus, pressure applied to the top of the cradle pad results in flexing of the spring portion 15 about its junctions with the main body portion 14 and the pad end portion 15. The resulting facility of flexing contributes outstanding resiliency to the pad support so that it affords prime support for the fruit yet is capable of yielding readily to any shock which results in downward pressure of the fruit against the pad.

The longitudinal supporting arms 13 are substantially identical to the transverse supporting arms 12. In the case of the longitudinal supporting arm adjacent the outboard end of the last pad in the row, the main body portion 14 of the arm is joined to the bottom edge of the end wall 5. In the case of a longitudinal supporting arm extending toward the next adjacent cradle pad, the extremities of the proximate longitudinal supporting arms are joined as shown in FIG. 1.

It will be seen, accordingly, that the main body portions of the transverse and longitudinal supporting arms lie in the plane of the bottom of the container. These portions thus contribute to the bottom support provided by the bottoms of the end walls and the longitudinal bottom rails. In addition, however, the main body portions of the longitudinal supporting arms 13 provide a backing surface against which the overlapping portions of a flexible transparent sheet overwrap 16 may be pressed to effect sealing. The flexibility of the supporting arms further permits the arms to be substantially flattened during this sealing operation so that the entire length of the bottom seam can be completely sealed, while at the same time insuring physical separation of the bottom of the fruit in the container from the hot plate used to effect the sealing.

The plastic trays of our invention can be formed by any conventional injection molding operation and are also of such design that they can be formed from sheet material by conventional vacuum molding technique.

We claim:

A plastic container for fruit and the like comprising two open framework end walls interconnected by a pair of longitudinal bottom rails and by a pair of side rails positioned above and spaced from the bottom rails, and a plurality of longitudinally spaced resiliently supported cradle pads for the fruit disposed in a plane substantially above that of the bottom of the container, each pad being supported in said plane by transverse, thin, flat, flexible supporting arms connected to the bottom rails and by at least one longitudinal, thin, flat, flexible supporting arm connected to a corresponding longitudinal supporting arm of a proximate cradle pad, each of the longitudinal supporting arms lying substantially medially of the bottom side rails and integrally joined to its proximate cradle pad, each of said supporting arms being of a width substantially less than the cradle pads and having the major portion of its length lying in the plane of the bottom of the container with that portion adjacent the proximate cradle pad only extending upwardly to resiliently support the cradle pad above the bottom of the container.

References Cited in the file of this patent

UNITED STATES PATENTS

| | | |
|---|---|---|
| 1,975,129 | Sherman | Oct. 5, 1934 |
| 2,442,998 | Eggl | June 8, 1948 |
| 2,498,042 | Kolber | Feb. 21, 1950 |
| 2,637,481 | Adams | May 5, 1953 |
| 2,682,949 | Whitehead | July 6, 1954 |
| 2,708,028 | Murphy | May 10, 1955 |
| 2,732,096 | Siciliano | Jan. 24, 1956 |
| 2,805,790 | Smucker | Sept. 10, 1957 |
| 2,818,166 | Hill | Dec. 31, 1957 |
| 2,825,449 | Britt et al. | Mar. 4, 1958 |
| 2,850,153 | Cosentino | Sept. 2, 1958 |

FOREIGN PATENTS

| | | |
|---|---|---|
| 630,283 | Great Britain | Oct. 10, 1949 |